United States Patent
Li et al.

(10) Patent No.: US 9,973,272 B2
(45) Date of Patent: May 15, 2018

(54) METHOD AND APPARATUS FOR MONITORING IN-LINE SIGNAL QUALITY AND SYSTEM

(71) Applicant: Fujitsu Limited, Kawasaki-shi, Kanagawa (JP)

(72) Inventors: Lei Li, Beijing (CN); Bo Liu, Beijing (CN); Zhenning Tao, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 0 days. days.

(21) Appl. No.: 15/475,485

(22) Filed: Mar. 31, 2017

(65) Prior Publication Data

US 2017/0288772 A1  Oct. 5, 2017

(30) Foreign Application Priority Data

Mar. 31, 2016  (CN) .......................... 2016 1 0195783

(51) Int. Cl.
*H04B 10/00* (2013.01)
*H04B 10/079* (2013.01)
*H04L 5/00* (2006.01)

(52) U.S. Cl.
CPC ....... *H04B 10/07953* (2013.01); *H04L 5/006* (2013.01)

(58) Field of Classification Search
USPC ............... 398/25–27, 76, 140, 158–159, 162
See application file for complete search history.

(56) References Cited

U.S. PATENT DOCUMENTS

| | | | |
|---|---|---|---|
| 8,532,499 B2* | 9/2013 | Caton | H04B 10/5051 359/245 |
| 8,634,724 B2* | 1/2014 | Buelow | H04L 5/0046 398/158 |
| 8,638,655 B2* | 1/2014 | Geile | G06F 17/14 370/208 |
| 9,258,166 B2* | 2/2016 | Yan | H04L 27/2662 |
| 2003/0156603 A1* | 8/2003 | Rakib | H03M 13/256 370/485 |
| 2009/0110033 A1* | 4/2009 | Shattil | H04B 1/7174 375/141 |

(Continued)

*Primary Examiner* — Agustin Bello
(74) *Attorney, Agent, or Firm* — Staas & Halsey LLP

(57) ABSTRACT

A method and apparatus for monitoring in-line signal quality and a system. The method for monitoring in-line signal quality includes: according to signal to noise ratios (SNRs) of subcarriers obtained in a transmission initialization period, setting a subcarrier with a highest SNR to be a pilot subcarrier and other subcarriers to be data subcarriers; determining bit allocation and power allocation of the pilot subcarrier and bit allocation and power allocation of the data subcarriers; setting data-decision-based SNR measurement thresholds for the data subcarriers according to the bit allocation of the data subcarriers; and comparing the SNRs of the data subcarriers obtained through data-decision-based SNR measurement in a transmission period with the SNR measurement thresholds of the data subcarriers, and when an SNR of a data subcarrier is less than its SNR measurement threshold, trigger pilot-based SNR measurement of the data subcarrier. Hence, not only temporally continuous in-line signal quality monitoring may be provided, but also accuracy of the monitoring result may be guaranteed.

9 Claims, 10 Drawing Sheets

(56) References Cited

U.S. PATENT DOCUMENTS

| | | | |
|---|---|---|---|
| 2015/0117576 A1* | 4/2015 | Yan | H04L 27/2662 |
| | | | 375/348 |
| 2015/0349887 A1* | 12/2015 | Jovicic | H04B 10/116 |
| | | | 398/26 |
| 2016/0119077 A1* | 4/2016 | Hu | H04B 10/516 |
| | | | 398/76 |
| 2017/0288772 A1* | 10/2017 | Li | H04L 5/006 |
| 2017/0331561 A1* | 11/2017 | Henry | H04B 10/90 |
| 2018/0013493 A1* | 1/2018 | Henry | H04B 14/02 |

* cited by examiner pilot subcarrier

METHOD AND APPARATUS FOR MONITORING IN-LINE SIGNAL QUALITY AND SYSTEM

CROSS-REFERENCE TO RELATED APPLICATIONS

This application claims the benefit of Chinese Application No. 201610195783.2, filed Mar. 31, 2016, in the Chinese Intellectual Property Office, the disclosure of which is incorporated herein by reference.

FIELD

The present disclosure relates to the field of communication technologies, and in particular to a method and apparatus for monitoring in-line signal quality and a system.

BACKGROUND

A multicarrier optical communication system based on discrete multi-tone (DMT) modulation is deemed as a major competing technology of a next generation short-range optical communication due to such features as high transmission rate, simple hardware structure, and low power consumption, etc., and interconnection of large-scale computers in a data center is a preferred application scenario of the multicarrier optical communication system based DMT. The DMT technology has been widely used in wireless communication and access networks; however, the scenario of data center has a higher requirement on stability of a transmission performance. In order to guarantee continuous stable transmission performance, it is necessary to monitor signal quality of carriers in a real-time manner during the transmission and perform corresponding adjustment according to a monitoring result. The monitoring of the signal quality is carried out by measuring signal to noise ratios of the subcarriers. Measurement of a signal to noise ratio in the known art may be divided into two types, pilot-based measurement and data-decision-based measurement, and calculating methods of which may be expressed by formulae (1) and (2):

$$SNR = \frac{E(|S_{rx}|^2)}{E(|S_{rx} - S_{tx}|^2)}; \quad (1)$$

$$SNR = \frac{E(|S_{rx}|^2)}{E\left(|S_{rx} - \hat{S}_{tx}|^2\right)}. \quad (2)$$

In the two formulae, $S_{rx}$ is a signal received by a receiver. It can be seen from comparison of formulae (1) and (2) that a difference between them is that which of the following two values is based on when calculating the noise, a known transmission signal ($S_{tx}$) or decision estimation ($\hat{S}_{tx}$) on a transmission signal.

The pilot-based measurement of a signal to noise ratio requires a transmitter to insert a signal known to a receiver into transmission data, and the receiver calculates a signal to noise ratio according to formula (1). As $S_{tx}$ is a known signal, the pilot-based measurement of a signal to noise ratio may provide an accurate result. However, as the pilot occupies a bandwidth for data transmission, which has an effect on quality of the data transmission, insertion of a pilot signal should not be so frequent, and a generally-agreed proportion is about 1%-5%. That is, the pilot-based monitoring of signal quality can only provide a 1%-5% of time sampling result, but cannot provide temporarily continuous real-time in-line monitoring.

And on the other hand, the data-decision-based monitoring of signal quality estimates a transmitted signal by directly performing decision on received data information, which may provide continuous in-line monitoring. However, due to errors possibly existed in the data decision, the data-decision-based monitoring of signal quality cannot provide an accurate measurement result, which is more obvious when a modulation format is relatively high or a noise is relatively large.

It should be noted that the above description of the background is merely provided for clear and complete explanation of the present disclosure and for easy understanding by those skilled in the art. And it should not be understood that the above technical solution is known to those skilled in the art as it is described in the background of the present disclosure.

SUMMARY

Based on a multicarrier optical communication system based on DMT, embodiments of the present disclosure propose a method and apparatus for monitoring in-line signal quality and a system, which are able to provide temporarily continuous in-line monitoring and guarantee accuracy of a monitoring result.

According to a first aspect of the embodiments of the present disclosure, there is provided an apparatus for monitoring in-line signal quality, configured in a receiving end of a multicarrier optical communication system based on DMT modulation, the apparatus including:

a first setting unit configured to, according to signal to noise ratios (SNRs) of subcarriers obtained in a transmission initialization period, set a subcarrier with a highest SNR to be a pilot subcarrier and other subcarriers to be data subcarriers;

a determining unit configured to determine bit allocation and power allocation of the pilot subcarrier and bit allocation and power allocation of the data subcarriers;

a second setting unit configured to set data-decision-based SNR measurement thresholds for the data subcarriers according to the bit allocation of the data subcarriers; and a processing unit configured to compare the SNRs of the data subcarriers obtained through data-decision-based SNR measurement in a transmission period with the SNR measurement thresholds of the data subcarriers, and when an SNR of a data subcarrier is less than its SNR measurement threshold, trigger pilot-based SNR measurement of the data subcarrier.

According to a second aspect of the embodiments of the present disclosure, there is provided an apparatus for monitoring in-line signal quality, configured in a transmitting end of a multicarrier optical communication system based on DMT modulation, the apparatus including:

a controlling unit configured to control a transmitter to transmit training sequences in subcarriers in a transmission initialization period;

a configuring unit configured to acquire bit allocation and power allocation of the subcarriers and a position of a pilot subcarrier, configure the subcarriers, and control the transmitter to map data to be transmitted or a training sequence to corresponding subcarriers; and a first processing unit configured to, in a case where the transmitter receives a pilot-based SNR measurement request regarding a data subcarrier, control the transmitter to exchange power allocation and bit allocation of the data subcarrier and the pilot subcarrier, adjust a data mapping relationship of the data subcarrier to the pilot subcarrier, adjust a mapping relationship of the training sequence of the pilot subcarrier to the data subcarrier, and synchronize with a receiver in a receiving end.

According to a third aspect of the embodiments of the present disclosure, there is provided a receiving end controller, including the apparatus as described in the first aspect.

According to a fourth aspect of the embodiments of the present disclosure, there is provided a transmitting end controller, including the apparatus as described in the second aspect.

According to a fifth aspect of the embodiments of the present disclosure, there is provided a receiver, including the receiving end controller as described in the third aspect.

According to a sixth aspect of the embodiments of the present disclosure, there is provided a transmitter, including the transmitting end controller as described in the fourth aspect.

According to a seventh aspect of the embodiments of the present disclosure, there is provided a multicarrier optical communication system based on DMT modulation, including a transmitter and a receiver; wherein, the system further includes the receiving end controller as described in the third aspect and the transmitting end controller as described in the fourth aspect.

According to an eighth aspect of the embodiments of the present disclosure, there is provided a method for monitoring in-line signal quality, applicable to a receiving end of a multicarrier optical communication system based on DMT modulation, the method including:

according to SNRs of subcarriers obtained in a transmission initialization period, setting a subcarrier with a highest SNR to be a pilot subcarrier and other subcarriers to be data subcarriers;

determining bit allocation and power allocation of the pilot subcarrier and bit allocation and power allocation of the data subcarriers;

setting data-decision-based SNR measurement thresholds for the data subcarriers according to the bit allocation of the data subcarriers; and comparing the SNRs of the data subcarriers obtained through data-decision-based SNR measurement in a transmission period with the SNR measurement thresholds of the data subcarriers, and when an SNR of a data subcarrier is less than its SNR measurement threshold, triggering pilot-based SNR measurement of the data subcarrier.

According to a ninth aspect of the embodiments of the present disclosure, there is provided a method for monitoring in-line signal quality, applicable to a transmitting end of a multicarrier optical communication system based on DMT modulation, the method including:

transmitting training sequences in subcarriers in a transmission initialization period by a transmitter;

acquiring bit allocation and power allocation of the subcarriers and a position of a pilot subcarrier, configuring the subcarriers, and mapping data to be transmitted or a training sequence to corresponding subcarriers; and in a case where the transmitter receives a pilot-based SNR measurement request regarding a data subcarrier, exchanging power allocation and bit allocation of the data subcarrier and the pilot subcarrier, adjusting a data mapping relationship of the data subcarrier to the pilot subcarrier, adjusting a mapping relationship of the training sequence of the pilot subcarrier to the data subcarrier, and synchronizing with a receiver in a receiving end.

An advantage of the embodiments of the present disclosure exists in that with the embodiments of this disclosure, not only temporally continuous in-line signal quality monitoring may be provided, but also accuracy of the monitoring result may be guaranteed. Hence, as few as possible pilot resources are used to achieve real-time in-line signal quality monitoring.

With reference to the following description and drawings, the particular embodiments of the present disclosure are disclosed in detail, and the principle of the present disclosure and the manners of use are indicated. It should be understood that the scope of the embodiments of the present disclosure is not limited thereto. The embodiments of the present disclosure contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

The drawings are included to provide further understanding of the present disclosure, which constitute a part of the specification and illustrate the preferred embodiments of the present disclosure, and are used for setting forth the principles of the present disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

An embodiment of this disclosure provides a method for monitoring in-line signal quality. The method is able to provide temporarily continuous in-line monitoring and guarantee accuracy of a monitoring result. The core of the embodiment of this disclosure is to reserve pilot monitoring resources, set SNR measurement threshold values of subcarriers, so as to simultaneously monitor data subcarriers by using the data-decision-based SNR measurement method to achieve temporarily continuous in-line monitoring. And at the same time, when an SNR of a subcarrier is lower than its value, a receiver and a transmitter are coordinated, and pilot-based SNR measurement is performed on the subcarrier, so as to guarantee accuracy of a monitoring result.

Figure 1:
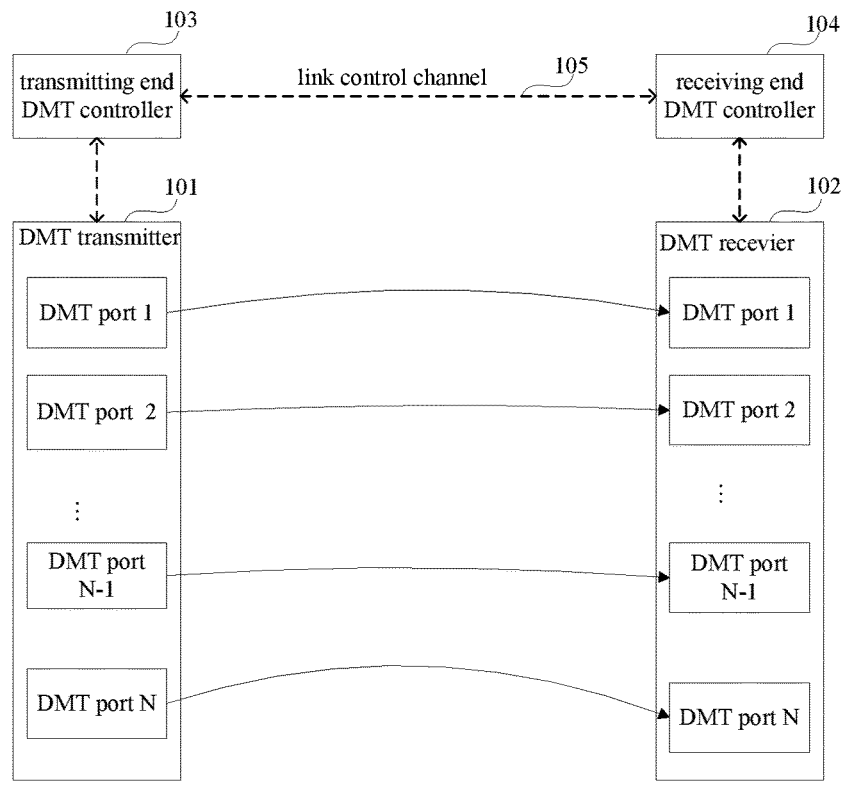
FIG. 1 is a schematic diagram of a multi-port DMT optical transmission system.

FIG. 1 is a schematic diagram of a multi-port DMT optical transmission system, a typical application scenario of which being ultra-high interconnection of large-scale computers in a data center. As shown in FIG. 1, in the embodiment of this disclosure, DMT transmitter 101 shares one transmitting end DMT controller 103, and DMT receiver 102 shares one receiving end DMT controller 104, the transmitting end DMT controller 103 and the receiving end DMT controller 104 exchanging information via a link control channel 105, and controlling the transmitter and the receiver to coordinate with each other.

Figure 2:
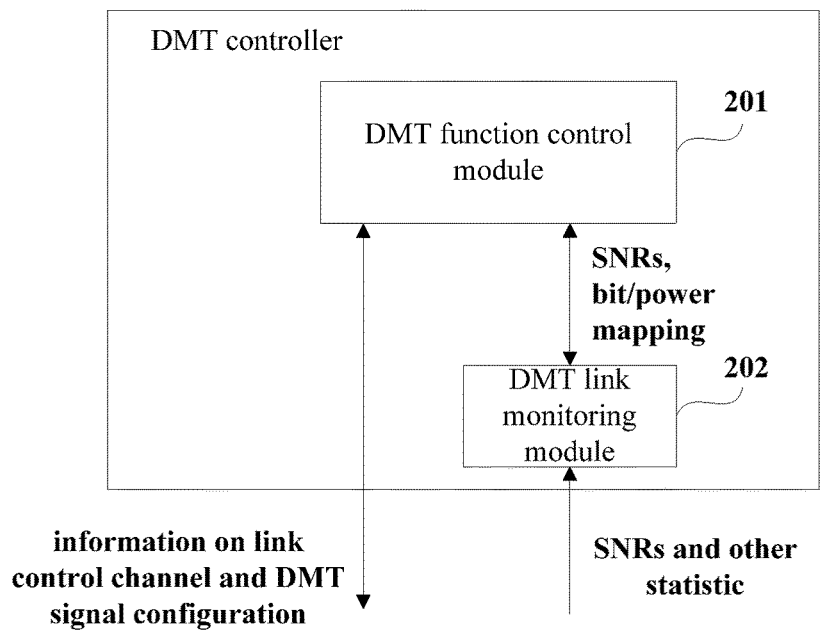
FIG. 2 is a schematic diagram of interior structure of a DMT controller.

FIG. 2 is a schematic diagram of interior structures of DMT controllers 103 and 104. As shown in FIG. 2, the DMT controllers 103 and 104 include a DMT function control module 201 and a DMT link monitoring module 202. The DMT function control module 201 is mainly responsible for extracting control information from the link control channel and configuring the transmitter and receiver according to the control information, configured contents including but not limited to bit allocation and power allocation for the DMT subcarriers, and setting of a pilot subcarrier, etc. And the DMT link monitoring module 202 is responsible for monitoring changes of links, including signal qualities of the subcarriers, and amplitude frequency and phase frequency characteristics of a transmission channel, etc.

In the embodiment of this disclosure, by coordinating the receiving end DMT controller 104 and the transmitting end DMT controller 103, adjusting use of the reserved pilot resources according to the in-line and real-time monitored SNRs of the subcarriers, so as to use few pilot resources to achieve real-time monitoring while guaranteeing accuracy of the monitoring.

Various implementations of this disclosure shall be described below with reference to the accompanying drawings.

Embodiment 1

Figure 3:
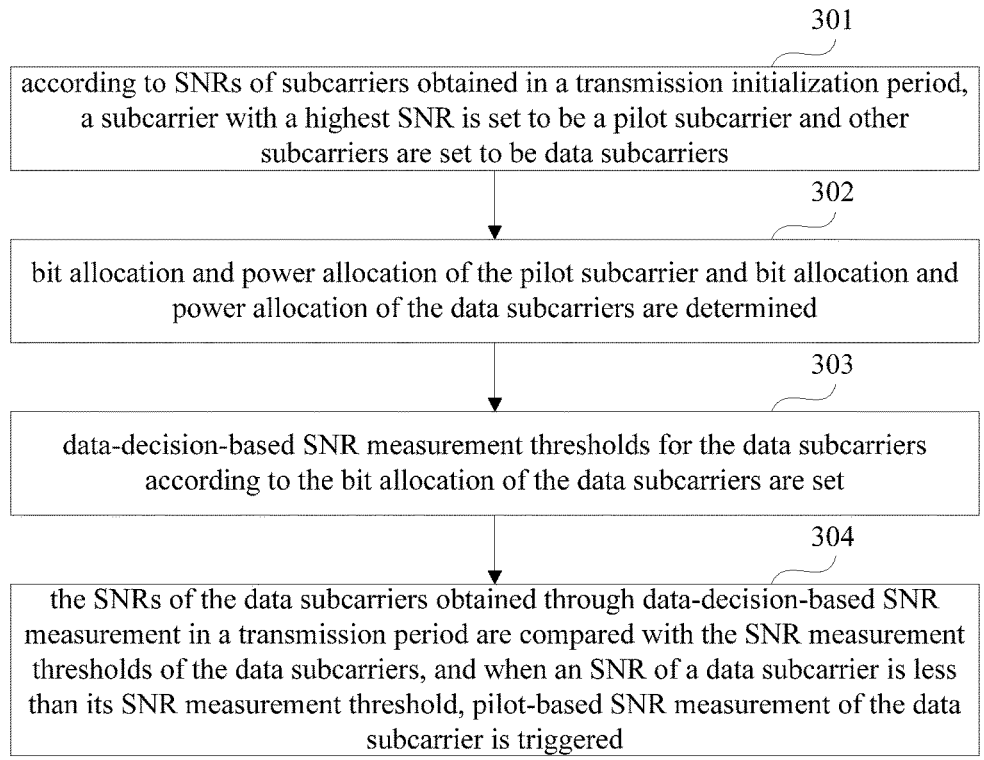
FIG. 3 is a flowchart of a method for monitoring in-line signal quality of Embodiment 1.

An embodiment of this disclosure provides a method for monitoring in-line signal quality, applicable to a receiving end of a multicarrier optical communication system based on DMT modulation, such as the DMT receiver 102 and the receiving end DMT controller 104 shown in FIG. 1. FIG. 3 is a schematic diagram of the method. As shown in FIG. 3, the method includes:

step 301: according to SNRs of subcarriers obtained in a transmission initialization period, a subcarrier with a highest SNR is set to be a pilot subcarrier and other subcarriers are set to be data subcarriers;

step 302: bit allocation and power allocation of the pilot subcarrier and bit allocation and power allocation of the data subcarriers are determined;

step 303: data-decision-based SNR measurement thresholds for the data subcarriers according to the bit allocation of the data subcarriers are set; and step 304: the SNRs of the data subcarriers obtained through data-decision-based SNR measurement in a transmission period are compared with the SNR measurement thresholds of the data subcarriers, and when an SNR of a data subcarrier is less than its SNR measurement threshold, pilot-based SNR measurement of the data subcarrier is triggered.

In step 301, the SNRs of the subcarriers obtained in the transmission initialization period may be obtained in a known process of DMT channel detection. For example, the DMT transmitter transmits training sequences in the subcarriers, and the DMT receiver performs SNR measurement (formula (1)) according to known transmission signals (the training sequences), so as to obtain accurate SNRs of the subcarriers. In this embodiment, this process may be performed in the DMT receiver.

In step 301, after the accurate SNRs of the subcarriers are obtained, a subcarrier with a highest SNR may be set to be a pilot subcarrier, which is used for in-line monitoring, and may also be referred to as an in-line monitoring pilot, and other subcarriers may be set to be data subcarriers. In this embodiment, this process may be performed in the above receiving end DMT controller 104. For example, after the DMT receiver performs the above channel detection, the DMT receiver reports the measured accurate SNRs of the subcarriers to the receiving end DMT controller 104, the DMT link monitoring module 202 of the receiving end DMT controller 104 sets the subcarrier with the highest SNR to be the pilot subcarrier, and sets other subcarriers to be the data subcarriers.

In step 302, the bit allocation and power allocation of the subcarriers may be determined according to the settings of the subcarriers. For the bit allocation and power allocation of the pilot subcarrier, they may be determined according to a system presetting. And for the bit allocation and power allocation of the data subcarriers, they may be determined according to the SNRs of the data subcarriers. For example, corresponding bit allocation and power allocation may be calculated for the data subcarriers according to the SNRs of the data subcarriers. As an example, this process may be performed in the above receiving end DMT controller 104. For example, the DMT link monitoring module 202 of the receiving end DMT controller 104 reports the above settings of the subcarriers to the DMT function control module 201 of the receiving end DMT controller 104, and the DMT function control module 201 calculates corresponding bit allocation and power allocation for the data subcarriers according to the SNRs of the data subcarriers, a calculation method being limited in this embodiment, and the bit allocation and power allocation of the pilot subcarrier may use the system presetting. After the calculation is finished, the DMT function control module 201 may further feed back a calculation result to the DMT link monitoring module 202. Furthermore, the DMT function control module 201 may set the DMT transmitter and DMT receiver according to the settings of the pilot and the data subcarriers and the bit allocation and power allocation of the data subcarriers, and then starts the data transmission.

Figure 4:
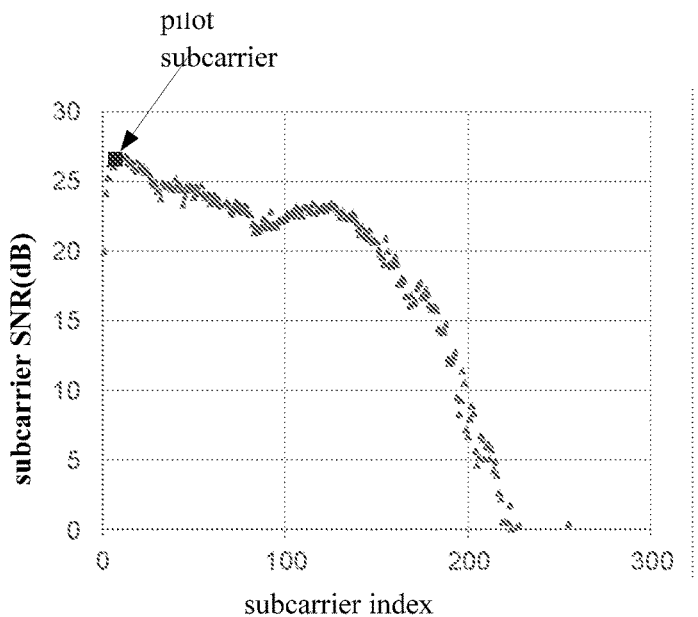
FIG. 4 is a schematic diagram of an SNR obtained in a transmission initialization period and a setting of a pilot subcarrier.
Figure 5:
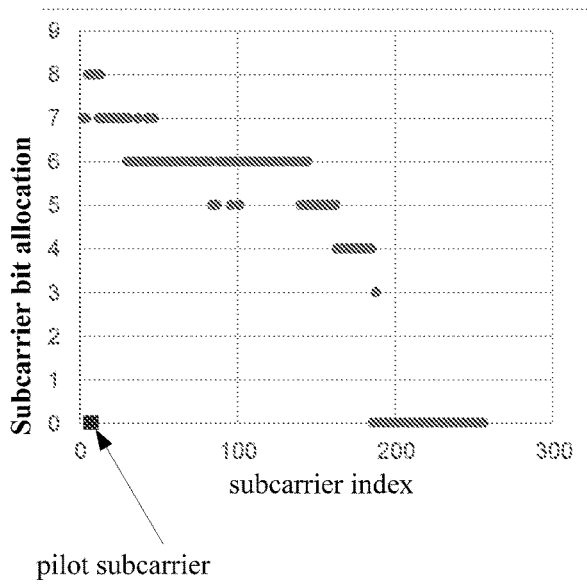
FIG. 5 is a schematic diagram of bit allocation of a subcarrier calculated according to SNR obtained in a transmission initialization period and the setting of the pilot subcarrier.

FIG. 4 is a schematic diagram of the SNR obtained in the transmission initialization period and the setting of the pilot subcarrier. As shown in FIG. 4, the subcarrier with the highest SNR is set to be the pilot subcarrier (a pilot for in-line SNR monitoring). FIG. 5 is a schematic diagram of the bit allocation of the subcarrier calculated according to the SNR obtained in the transmission initialization period and the setting of the pilot subcarrier. As shown in FIG. 5, no data are transmitted in the pilot subcarrier, and data are transmitted in other subcarriers.

In step 303, after the bit allocation of the data subcarriers are obtained, the data-decision-based SNR measurement thresholds may be set for the data subcarriers according to the bit allocation of the data subcarriers, a basis for setting the thresholds being an error of a data-decision-based signal to noise measurement method. The error of the data-decision-based signal to noise measurement method is related to three factors, data modulation, an actual SNR, and a characteristic of a noise.

Figure 6:
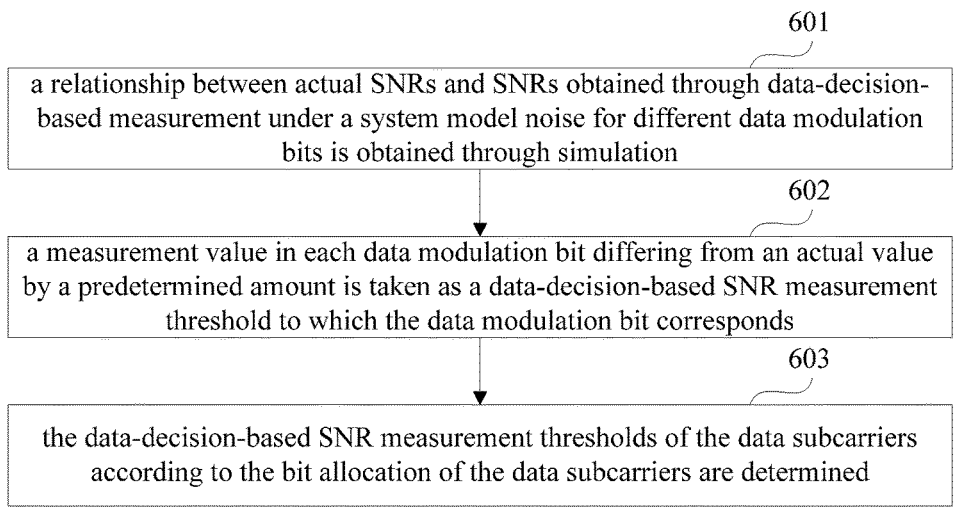
FIG. 6 is a flowchart of an implementation of setting a threshold.

FIG. 6 is a flowchart of an implementation of setting the threshold. As shown in FIG. 6, the flow includes:

step 601: a relationship between actual SNRs and SNRs obtained through data-decision-based measurement under a system model noise for different data modulation bits is obtained through simulation;

step 602: a measurement value in each data modulation bit differing from an actual value by a predetermined amount is taken as a data-decision-based SNR measurement threshold to which the data modulation bit corresponds; and step 603: the data-decision-based SNR measurement thresholds of the data subcarriers according to the bit allocation of the data subcarriers are determined.

In step 601, the above measurement refers to data-decision-based measurement. In an implementation, the SNRs obtained through measurement are measurement values obtained by adding noises complying with noise characteristics to the actual SNRs in a data modulation constellation and performing data-decision-based SNR measurement on data with the noises.

Figure 7:
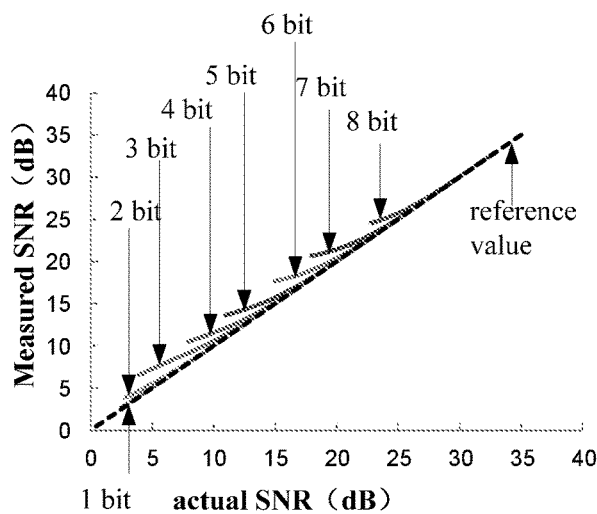
FIG. 7 is a schematic diagram of a relationship between an actual SNR and a measured SNR in an implementation.

FIG. 7 is an embodiment in a scenario where it is assumed that the noise of the transmission system is an additive Gaussian white noise, which gives a relationship between SNRs obtained through measurement and actual SNRs of different data modulation under an assumption of a Gaussian white noise. As described above, such a relationship may be obtained through simulation. For example, according to the measurement values obtained by adding noises complying with noise characteristics to the actual SNRs in the data modulation constellation and performing data-decision-based SNR measurement on the data with the noises by using formula (2), the relationship between the measured SNRs (the measurement values) and the actual SNRs (the actual values) is obtained.

In step 602, the above SNR measurement thresholds may be set according to the relationship between the measurement values and the actual values shown in FIG. 7. As an example, a measurement value in each data modulation bit differing from an actual value by 0.2 dB may be set to be a threshold to which the data modulation corresponds, thereby obtaining SNR measurement thresholds corresponding to different data modulation as listed in Table 1 below. That is, for certain data modulation, when its SNR obtained through data-decision-based SNR measurement (a measurement value) is less than its corresponding threshold in the table, an error of the measurement is greater than 0.2 dB.

TABLE 1

| Bit allocation | SNR measurement threshold |
| --- | --- |
| 8 | 27.5 dB |
| 7 | 24 dB |
| 6 | 21 dB |
| 5 | 17 dB |
| 4 | 14 dB |
| 3 | 12 dB |
| 2 | 7 dB |
| 1 | 3 dB |

In step 603, the relationship between the bit allocation and the SNR measurement threshold in Table 1 is obtained, and the data-decision-based SNR measurement thresholds of the data subcarriers may be determined according to the bit allocation of the data subcarriers.

The method for setting the SNR measurement thresholds shown in FIG. 6 is illustrative only, and any other implementable methods for setting data-decision-based SNR measurement thresholds according to an error of a method of data-decision-based SNR measurement are covered by the protection scope of this application.

In this embodiment, after the transmission starts, the DMT receiver may perform data-decision-based SNR measurement on all the data subcarriers, so as to monitor quality of transmission signals in a real-time manner.

In step 304, the SNRs of the data subcarriers obtained through data-decision-based SNR measurement in the transmission period may be compared with the SNR measurement thresholds of the data subcarriers, and when an SNR of a data subcarrier obtained through measurement is less than its SNR measurement threshold, pilot-based SNR measurement of the data subcarrier is triggered. This process may be performed by the receiving end DMT controller 104. For example, the DMT link monitoring module 202 in the receiving end DMT controller 104 may read the measured SNRs of the data subcarriers from the DMT receiver, and compare the read SNRs of the data subcarriers with the thresholds set by it. If an SNR read from a data subcarrier is less than its threshold, it shows that for this data subcarrier, data-decision-based SNR measurement cannot provide accurate monitoring of signal quality. Hence, the DMT link monitoring module 202 may trigger the DMT function control module 201 to notify a DMT transmitter in the opposite end to start pilot-based SNR measurement on the data subcarrier. And the notification may be transmitted via the above-described link control channel 105.

Figure 8:
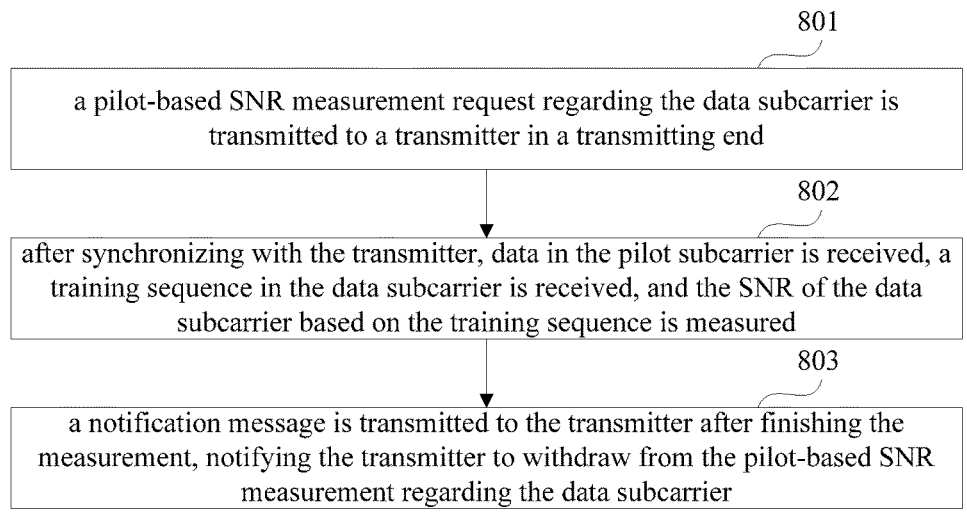
FIG. 8 is a flowchart of an implementation of starting pilot-based SNR measurement on a data subcarrier.

FIG. 8 is a flowchart of an implementation of starting pilot-based SNR measurement on a data subcarrier. As shown in FIG. 8, the flow includes:

step 801: a pilot-based SNR measurement request regarding the data subcarrier is transmitted to a transmitter in a transmitting end;

step 802: after synchronizing with the transmitter, data in the pilot subcarrier is received, a training sequence in the data subcarrier is received, and the SNR of the data subcarrier based on the training sequence is measured; and step 803: a notification message is transmitted to the transmitter after finishing the measurement, notifying the transmitter to withdraw from the pilot-based SNR measurement regarding the data subcarrier.

In step 801, the DMT function control module 201 of the receiving end DMT controller 104 may transmit the above request to the transmitting end DMT controller 103 via the above-described link control channel 105, and the transmitting end DMT controller 103 may notify the DMT transmitter 101 in the transmitting end to perform corresponding operations according to the above request. After the DMT transmitter 101 receives the notification, it will make preparation for performing exchange operations, and exchange data in the data subcarrier with the training sequence in the pilot subcarrier, so as to guarantee that the data transmission is uninterrupted. A particular process of the DMT transmitter 101 shall be described in the following embodiment.

In step 802, the DMT receiver 102 synchronizes with the exchange operation of the DMT transmitter 101, it receives the data from the position of the pilot subcarrier, receives the training sequence from the position of the data subcarrier, and performs the pilot (the known training sequence)-based SNR measurement on the data subcarrier according to formula (1).

In step 803, after the measurement in step 802 is finished, the receiving end DMT controller 104 may further notify the DMT transmitter 101 to withdraw from the pilot-based SNR measurement regarding the data subcarrier, so as to release pilot resources.

Figure 9:
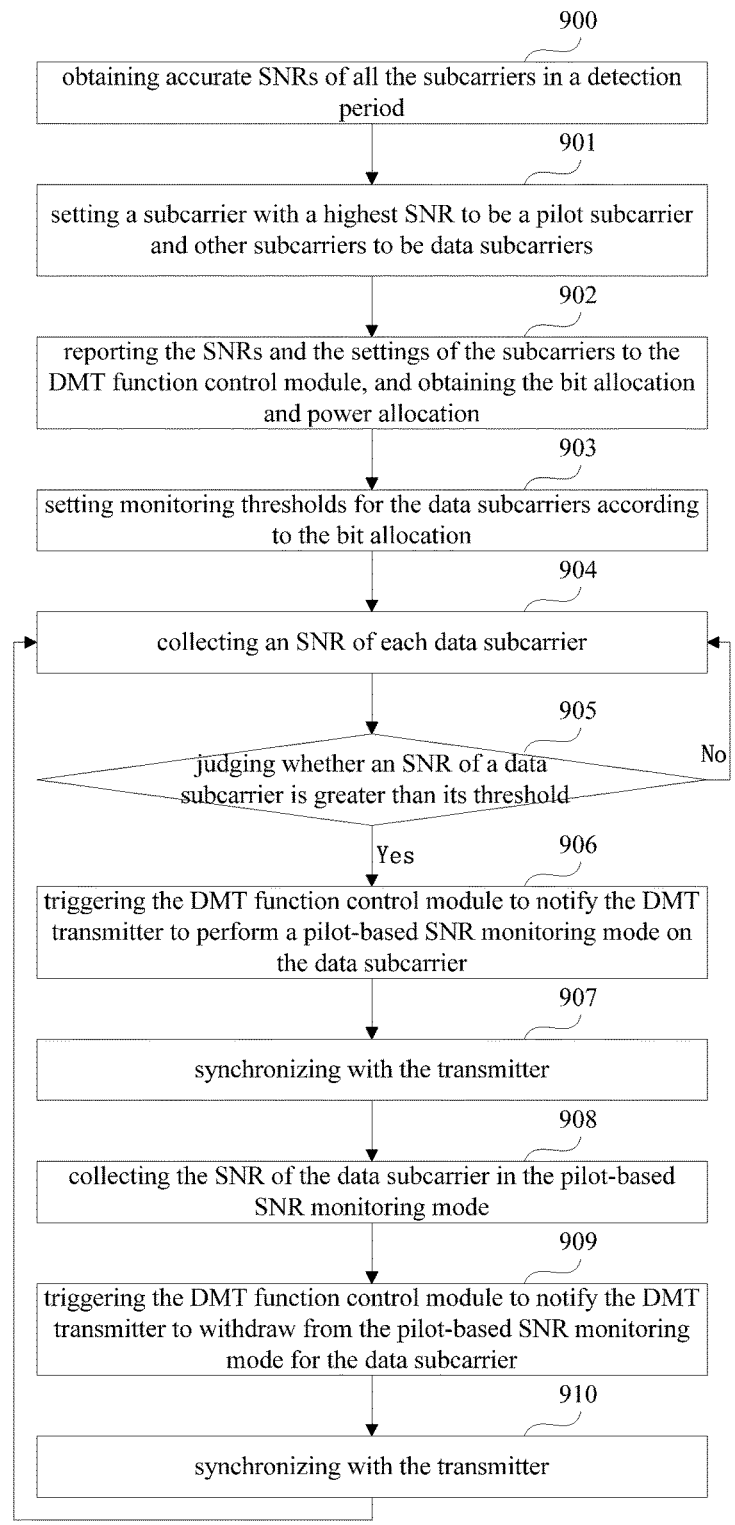
FIG. 9 is an overall flowchart of in-line signal quality monitoring performed at a receiving end.

FIG. 9 is an overall flowchart of in-line signal quality monitoring performed at the receiving end of the DMT optical transmission system. An implementation procedure of the method of this embodiment may be understood from this process. However, this flowchart does not constitute a limit to this application. Referring to FIG. 9, the flow includes:

step 900: obtaining accurate SNRs of all the subcarriers in a detection period;

step 901: setting a subcarrier with a highest SNR to be a pilot subcarrier and other subcarriers to be data subcarriers;

step 902: reporting the SNRs and the settings of the subcarriers to the DMT function control module, and obtaining the bit allocation and power allocation;

step 903: setting monitoring thresholds for the data subcarriers according to the bit allocation;

step 904: collecting an SNR of each data subcarrier;

step 905: judging whether an SNR of a data subcarrier is greater than its threshold, and executing step 906, otherwise, turning back to step 904;

step 906: triggering the DMT function control module to notify the DMT transmitter to perform a pilot-based SNR monitoring mode on the data subcarrier;

step 907: synchronizing with the transmitter;

step 908: collecting the SNR of the data subcarrier in the pilot-based SNR monitoring mode;

step 909: triggering the DMT function control module to notify the DMT transmitter to withdraw from the pilot-based SNR monitoring mode for the data subcarrier; and step 910: synchronizing with the transmitter.

With the method of this embodiment, not only temporally continuous in-line signal quality monitoring may be provided, but also accuracy of the monitoring result may be guaranteed. Hence, as few as possible pilot resources are used to achieve real-time in-line signal quality monitoring.

Embodiment 2

Figure 10:
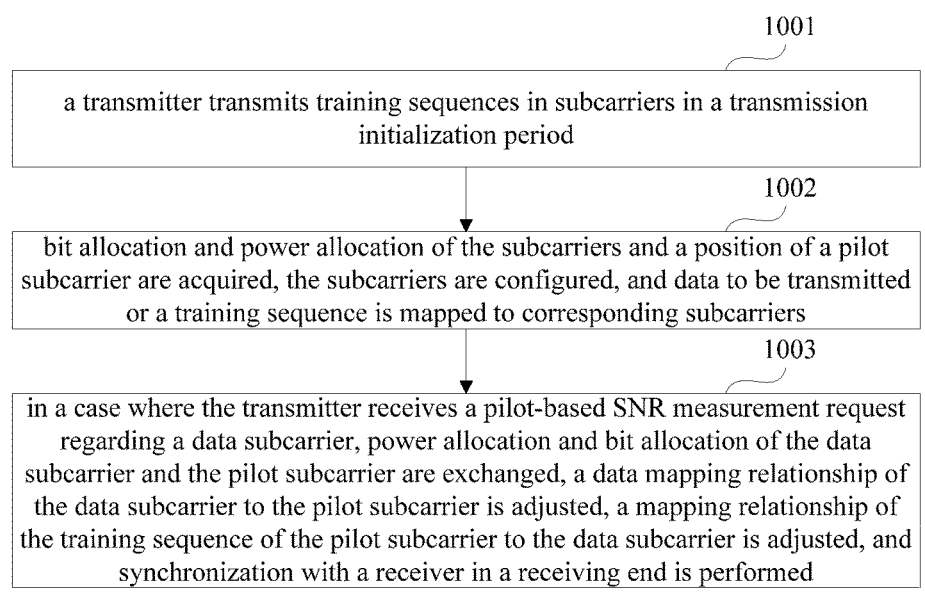
FIG. 10 is a flowchart of a method for monitoring in-line signal quality of Embodiment 2.

An embodiment of this disclosure provides a method for monitoring in-line signal quality, applicable to a transmitting end of a multicarrier optical communication system based on DMT modulation, such as the DMT transmitter 101 and the transmitting end DMT controller 103 shown in FIG. 1. This method is processing at the transmitting end corresponding to the method of Embodiment 1, with contents identical to those in Embodiment 1 being not going to be described herein any further. FIG. 10 is a schematic diagram of the method. As shown in FIG. 10, the method includes:

step 1001: a transmitter transmits training sequences in subcarriers in a transmission initialization period;

step 1002: bit allocation and power allocation of the subcarriers and a position of a pilot subcarrier are acquired, the subcarriers are configured, and data to be transmitted or a training sequence is mapped to corresponding subcarriers; and step 1003: in a case where or when the transmitter receives a pilot-based SNR measurement request regarding a data subcarrier, power allocation and bit allocation of the data subcarrier and the pilot subcarrier are exchanged, a data mapping relationship of the data subcarrier to the pilot subcarrier is adjusted, a mapping relationship of the training sequence of the pilot subcarrier to the data subcarrier is adjusted, and synchronization with a receiver in a receiving end is performed.

In step 1001, in the transmission initialization period, the DMT transmitter 101 transmits the sequences in the subcarriers, and the DMT receiver 102 may obtain accurate SNRs of the subcarrier according to the pilot-based SNR measurement performed on the subcarriers.

In step 1002, the DMT transmitter 101 may obtain the bit allocation and power allocation of the subcarriers and the position of the pilot subcarrier from the DMT receiver 102 via the above-described link control channel 105, and according to the information, the DMT transmitter 101 may configure the subcarriers, map the data to be transmitted or the training sequence to the corresponding subcarriers, and start the transmission process.

In step 1003, during transmission, once the DMT transmitter 101 receives a pilot-based SNR measurement request regarding a data subcarrier via the above-described link control channel 105 (corresponding to above step 806), the DMT transmitter 101 exchanges power allocation and bit allocation of the data subcarrier and the pilot subcarrier, adjusts the data mapping relationship of the data subcarrier to the pilot subcarrier, adjusts the mapping relationship of the training sequence of the pilot subcarrier to the data subcarrier, and synchronize with the receiver in the receiving end.

As an implementation, this process may be performed in the transmitting end DMT controller 103. For example, the DMT function control module 201 of the transmitting end DMT controller 103 first exchanges the bit allocation and power allocation of the data subcarrier with the power allocation and bit allocation of the pilot subcarrier, and then adjusts the data mapping relationship of the data subcarrier to the pilot subcarrier, and adjusts the mapping relationship of the training sequence of the pilot subcarrier to the data subcarrier. Hence, exchange of them is achieved, and continuity of transmission traffics during the measurement is guaranteed. Furthermore, the DMT transmitter 101 and the DMT receiver 102 may further synchronize the above operations via the above-described link control channel 105. A simple embodiment of the synchronization is that the DMT transmitter 101 and the DMT receiver 102 negotiate an exchange occurrence moment. At this time, the DMT transmitter 101 performs an actual exchange operation, and what are received by the DMT receiver 102 after this time are signals after the data subcarrier and the pilot subcarrier are exchanged. Hence, the DMT receiver 102 may perform the pilot-based SNR measurement in the original data subcarrier, so as to guarantee accuracy of the measurement (corresponding to above step 808).

In step 1003, if the DMT transmitter 101 receives a notification message of measurement completion regarding the data subcarriers via the above-described link control channel 105, the DMT transmitter 101 may recover the power and bit allocation of the data subcarrier and the pilot subcarrier, recover the data mapping relationship of the data subcarrier to the data subcarrier, recover the mapping relationship of the training sequence of the pilot subcarrier to the pilot subcarrier, and synchronize with the receiver of the receiving end. In this step, the DMT transmitter 101 waits for an indication of measurement completion from the DMT receiver 102, and after receiving the indication, the DMT transmitter 101 performs a reverse operation of the above exchange, and synchronizes with the DMT receiver 102, so as to finish release of pilot resources. Likewise, this process may also be performed in the transmitting end DMT controller 103, which shall not be described herein any further.

Figure 11:
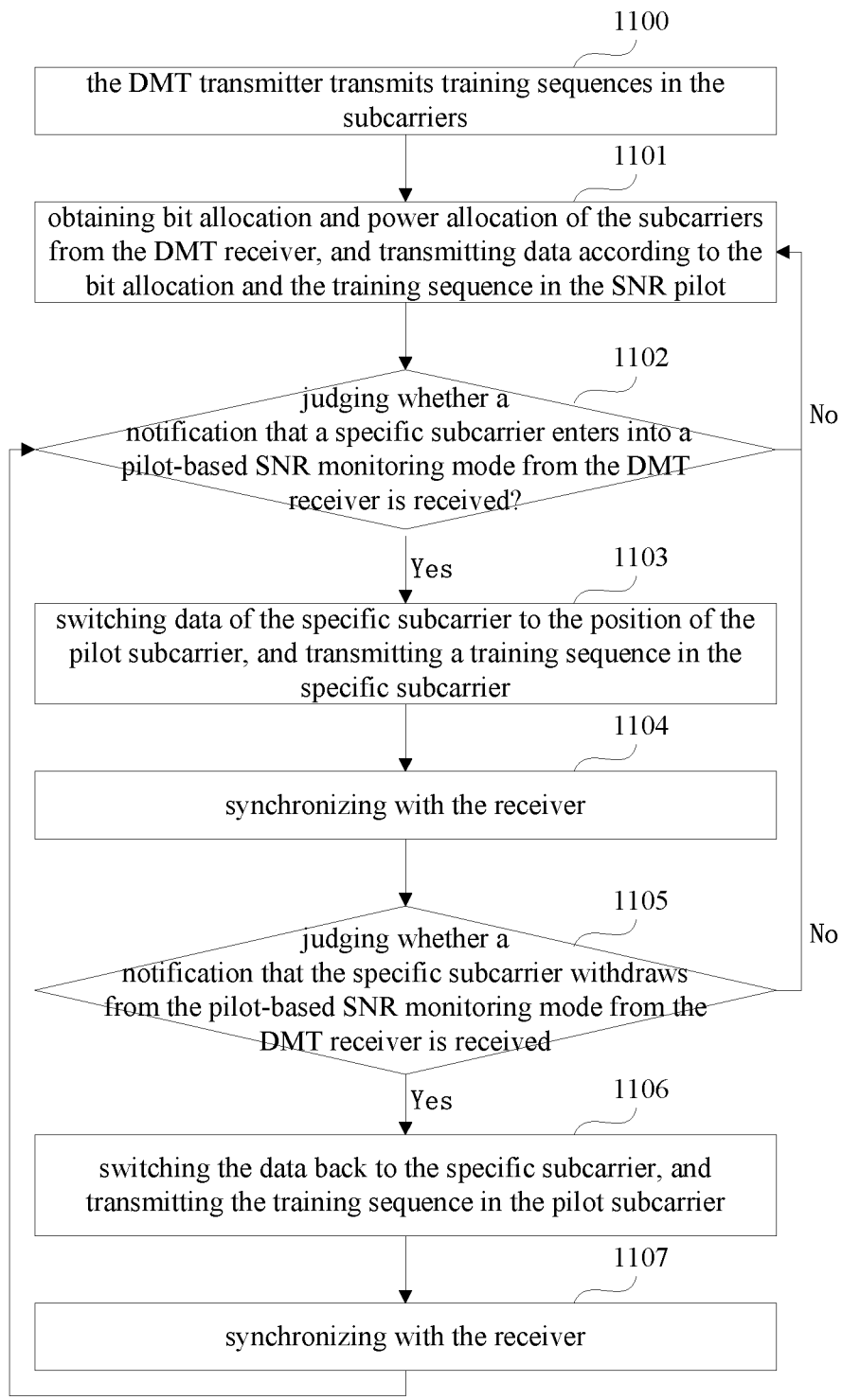
FIG. 11 is an overall flowchart of in-line signal quality monitoring performed at a transmitting end.

FIG. 11 is an overall flowchart of in-line signal quality monitoring performed at the transmitting end of the DMT optical transmission system. An implementation procedure of the method of this embodiment may be understood from this process. However, this flowchart does not constitute a limit to this application. Referring to FIG. 11, the flow includes:

step 1100: the DMT transmitter transmits training sequences in the subcarriers;

step 1101: obtaining bit allocation and power allocation of the subcarriers from the DMT receiver, and transmitting data according to the bit allocation and the training sequence in the SNR pilot;

step 1102: judging whether a notification that a specific subcarrier enters into a pilot-based SNR monitoring mode from the DMT receiver is received, executing step 1103 if it is judged yes, otherwise, turning back to step 1101;

step 1103: switching data of the specific subcarrier to the position of the pilot subcarrier, and transmitting a training sequence in the specific subcarrier;

step 1104: synchronizing with the receiver;

step 1105: judging whether a notification that the specific subcarrier withdraws from the pilot-based SNR monitoring mode from the DMT receiver is received, executing step 1106 if it is judged yes, otherwise, turning back to step 1101;

step 1106: switching the data back to the specific subcarrier, and transmitting the training sequence in the pilot subcarrier;

step 1107: synchronizing with the receiver.

With the method of this embodiment, not only temporally continuous in-line signal quality monitoring may be provided, but also accuracy of the monitoring result may be guaranteed. Hence, as few as possible pilot resources are used to achieve real-time in-line signal quality monitoring.

Embodiment 3

An embodiment of this disclosure provides an apparatus for monitoring in-line signal quality, configured in a receiving end of a multicarrier optical communication system based on DMT modulation, such as the DMT receiver 102 and the receiving end DMT controller 104 shown in FIG. 1. As principles of the apparatus are similar to that of the method of Embodiment 1, the implementation of the method of Embodiment 1 may be referred to for implementation of the apparatus, with identical contents being not going to be described herein any further.

Figure 12:
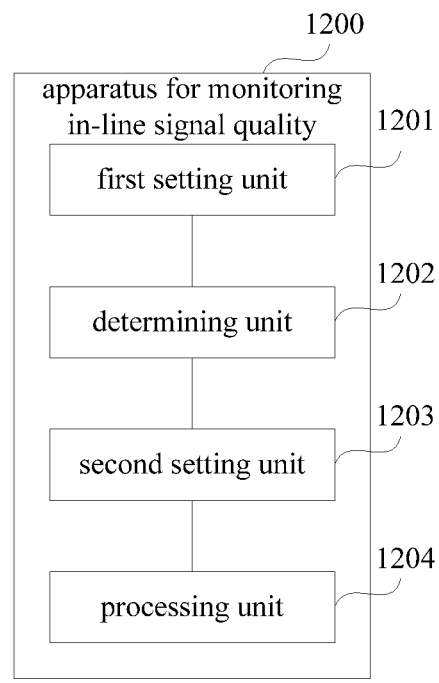
FIG. 12 is a schematic diagram of an apparatus for monitoring in-line signal quality of Embodiment 3.

FIG. 12 is a schematic diagram of the apparatus. As shown in FIG. 12, the apparatus 1200 includes a first setting unit 1201, a determining unit 1202, a second setting unit 1203 and a processing unit 1204.

The first setting unit 1201 is configured to, according to SNRs of subcarriers obtained in a transmission initialization period, set a subcarrier with a highest SNR to be a pilot subcarrier and other subcarriers to be data subcarriers; the determining unit 1202 is configured to determine bit allocation and power allocation of the pilot subcarrier and bit allocation and power allocation of the data subcarriers; the second setting unit 1203 is configured to set data-decision-based SNR measurement thresholds for the data subcarriers according to the bit allocation of the data subcarriers; and the processing unit 1204 is configured to compare the SNRs of the data subcarriers obtained through data-decision-based SNR measurement in a transmission period with the SNR measurement thresholds of the data subcarriers, and when an SNR of a data subcarrier is less than its SNR measurement threshold, trigger pilot-based SNR measurement of the data subcarrier.

In this embodiment, the first setting unit 1201 may be carried out by the above-described DMT link monitoring module 202, and the determining unit 1202, the second setting unit 1203 and the processing unit 1204 may be carried out by the DMT function control module 201.

Figure 13:
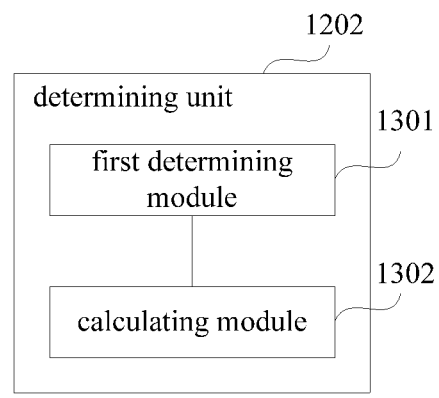
FIG. 13 is a schematic diagram of a determining unit of FIG. 12.

FIG. 13 is a schematic diagram of an implementation of the determining unit 1202. As shown in FIG. 13, the determining unit 1202 includes: a first determining module 1301 and a calculating module 1302. The first determining module 1301 determines the bit allocation and power allocation of the pilot subcarrier according to a system presetting; and the calculating module 1302 calculates corresponding bit allocation and power allocation for the data subcarriers according to the SNRs of the data subcarriers. A particular calculation method is not limited in this embodiment.

Figure 14:
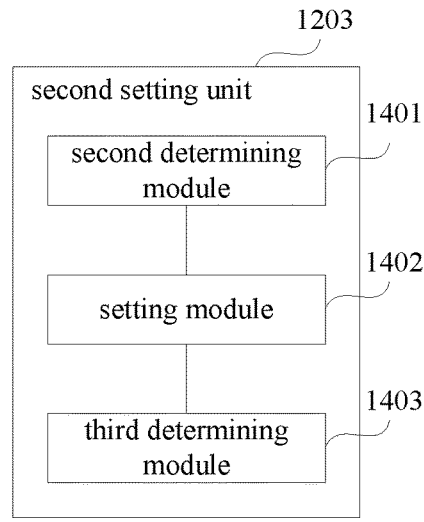
FIG. 14 is a schematic diagram of a second setting unit of FIG. 12.

FIG. 14 is a schematic diagram of an implementation of the second setting unit 1203. As shown in FIG. 14, the second setting unit 1203 includes a second determining module 1401, a setting module 1402 and a third determining module 1403.

The second determining module 1401 is configured to obtain through simulation a relationship between actual SNRs and SNRs obtained through data-decision-based measurement under a system model noise for different data modulation bits; the setting module 1402 is configured to take a measurement value in each data modulation bit differing from an actual value by a predetermined amount as a data-decision-based SNR measurement threshold to which the data modulation bit corresponds; and the third determining module 1403 is configured to determine the data-decision-based SNR measurement thresholds of the data subcarriers according to the bit allocation of the data subcarriers. In this implementation, the SNRs obtained through measurement are measurement values obtained by adding noises complying with noise characteristics to the actual SNRs in a data modulation constellation and performing data-decision-based SNR measurement on data with the noises.

The implementation shown in FIG. 14 is illustrative only. And in other implementations, data-decision-based SNR measurement thresholds for the data subcarriers may be provided out of the apparatus 100, and the thresholds may be provided to the second setting unit 1203.

Figure 15:
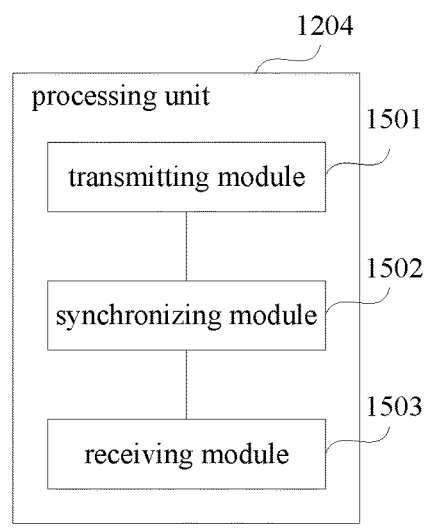
FIG. 15 is a schematic diagram of a processing unit of FIG. 12.

FIG. 15 is a schematic diagram of an implementation of the processing unit 1204. As shown in FIG. 15, the processing unit 1204 includes a transmitting module 1501, a synchronizing module 1502 and a receiving module 1503.

The transmitting module 1501 is configured to transmit a pilot-based SNR measurement request regarding the data subcarrier to a transmitter in a transmitting end; the synchronizing module 1502 is configured to synchronize with the transmitter; and the receiving module 1503 is configured to receive data in the pilot subcarrier, receive a training sequence in the data subcarrier, and measure the SNR of the data subcarrier based on the training sequence. And the transmitting module 1501 may transmit a notification message to the transmitter after the receiving module 1503 finishes the measurement, notify the transmitter to withdraw from the pilot-based SNR measurement regarding the data subcarrier.

In this implementation, the above processing by the processing unit 1204 may be performed by the DMT receiver 102 under control of the receiving end DMT controller 104, with details being as those described in Embodiment 1, and being not going to be described herein any further.

With the apparatus of this embodiment, not only temporally continuous in-line signal quality monitoring may be provided, but also accuracy of the monitoring result may be guaranteed. Hence, as few as possible pilot resources are used to achieve real-time in-line signal quality monitoring.

Embodiment 4

Figure 16:
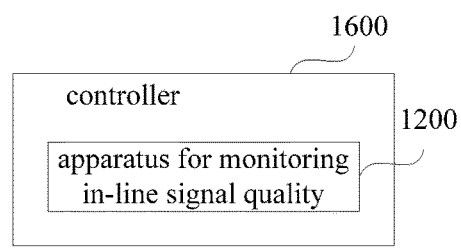
FIG. 16 is a schematic diagram of a controller of Embodiment 4.

An embodiment of this disclosure provides a controller. FIG. 16 is a schematic diagram of the controller. As shown in FIG. 16, the controller 1600 includes the apparatus 1200 for monitoring in-line signal quality as described in Embodiment 3. As the apparatus 1200 for monitoring in-line signal quality has been described in detail in Embodiment 3, its contents are incorporated herein, and shall not be described herein any further.

In this embodiment, the controller 1600 may be configured in a receiving end of a multicarrier optical communication system based on DMT modulation. For example, it may be configured in the DMT receiver 102, and may also be configured out of the DMT receiver 102.

With the controller of this embodiment, not only temporally continuous in-line signal quality monitoring may be provided, but also accuracy of the monitoring result may be guaranteed. Hence, as few as possible pilot resources are used to achieve real-time in-line signal quality monitoring.

Embodiment 5

An embodiment of this disclosure provides an apparatus for monitoring in-line signal quality, configured in a transmitting end of a multicarrier optical communication system based on DMT modulation, such as the DMT transmitter 101 and the transmitting end DMT controller 103 shown in FIG. 1. As principles of the apparatus are similar to that of the method of Embodiment 2, the implementation of the method of Embodiment 2 may be referred to for implementation of the apparatus, with identical contents being not going to be described herein any further.

Figure 17:
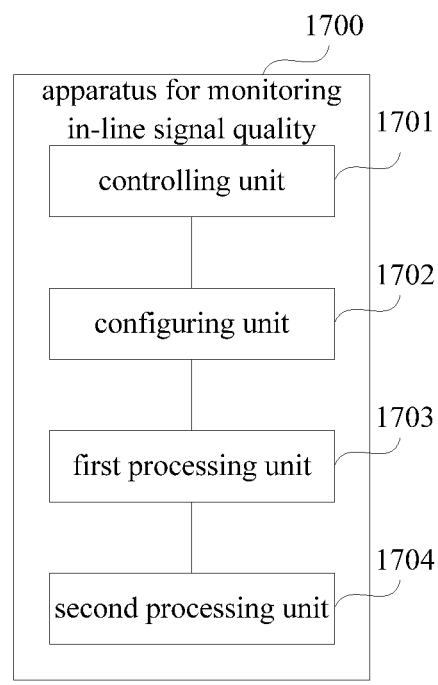
FIG. 17 is a schematic diagram of an apparatus for monitoring in-line signal quality of Embodiment 5.

FIG. 17 is a schematic diagram of the apparatus. As shown in FIG. 17, the apparatus 1700 includes a controlling unit 1701, a configuring unit 1702 and a first processing unit 1703.

The controlling unit 1701 is configured to control a transmitter to transmit training sequences in subcarriers in a transmission initialization period; the configuring unit 1702 is configured to acquire bit allocation and power allocation of the subcarriers and a position of a pilot subcarrier, configure the subcarriers, and map data to be transmitted or a training sequence to corresponding subcarriers; and the first processing unit 1703 is configured to, in a case where or when the transmitter receives a pilot-based SNR measurement request regarding a data subcarrier, exchange power allocation and bit allocation of the data subcarrier and the pilot subcarrier, adjust a data mapping relationship of the data subcarrier to the pilot subcarrier, adjust a mapping relationship of the training sequence of the pilot subcarrier to the data subcarrier, and synchronize with a receiver in a receiving end.

In this embodiment, as shown in FIG. 17, the apparatus further includes a second processing unit 1704, which is configured to, when the transmitter receives a notification message of measurement completion regarding the data subcarrier, recover power allocation and bit allocation of the data subcarrier and the pilot subcarrier, recover the data mapping relationship of the data subcarrier to the data subcarrier, recover the mapping relationship of the training sequence of the pilot subcarrier to the pilot subcarrier, and synchronize with the receiver in the receiving end.

In this embodiment, synchronizing with the receiver may be make an agreement with the receiver on an exchange moment, and perform said exchange at the exchange moment.

With the apparatus of this embodiment, not only temporally continuous in-line signal quality monitoring may be provided, but also accuracy of the monitoring result may be guaranteed. Hence, as few as possible pilot resources are used to achieve real-time in-line signal quality monitoring.

Embodiment 6

Figure 18:
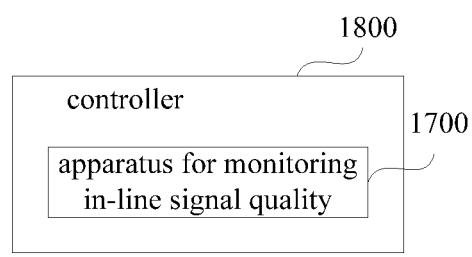
FIG. 18 is a schematic diagram of a controller of Embodiment 6.

An embodiment of this disclosure provides a controller. FIG. 18 is a schematic diagram of the controller. As shown in FIG. 18, the controller 1800 includes the apparatus 1700 for monitoring in-line signal quality as described in Embodiment 5. As the apparatus 1700 for monitoring in-line signal quality has been described in detail in Embodiment 5, its contents are incorporated herein, and shall not be described herein any further.

In this embodiment, the controller 1800 may be configured in a transmitting end of a multicarrier optical communication system based on DMT modulation. For example, it may be configured in the DMT transmitter 101, and may also be configured out of the DMT transmitter 101.

With the controller of this embodiment, not only temporally continuous in-line signal quality monitoring may be provided, but also accuracy of the monitoring result may be guaranteed. Hence, as few as possible pilot resources are used to achieve real-time in-line signal quality monitoring.

Embodiment 7

An embodiment of this disclosure provides a multicarrier optical communication system based on DMT modulation. FIG. 1 is a schematic diagram of a structure of the system. As shown in FIG. 1, the system 100 includes a DMT transmitter 101, a DMT receiver 102, a transmitting end DMT controller 103, a receiving end DMT controller 104 and a link control channel 105.

In this embodiment, the transmitting end DMT controller 103 may be carried out by the controller 1400 of Embodiment 6, and the receiving end DMT controller 104 may be carried out by the controller 1200 of Embodiment 4. As the controllers are described in detail in embodiments 4 and 6, their contents are incorporated herein, and shall not be described herein any further.

In this embodiment, the transmitting end DMT controller 103 and the receiving end DMT controller 104 being respectively independent from the DMT transmitter 101 and the DMT receiver 102 is taken as an example. In a particular implementation, the transmitting end DMT controller 103 and the receiving end DMT controller 104 may also be respectively configured in the DMT transmitter 101 and the DMT receiver 102.

With the system of this embodiment, not only temporally continuous in-line signal quality monitoring may be provided, but also accuracy of the monitoring result may be guaranteed. Hence, as few as possible pilot resources are used to achieve real-time in-line signal quality monitoring.

An embodiment of the present disclosure further provides a non-transitory computer readable program code, which, when executed in a receiving end controller, will cause the receiving end controller to carry out the method as described in Embodiment 1.

An embodiment of the present disclosure further provides a non-transitory computer readable medium, including a computer readable program code, which will cause a receiving end controller to carry out the method as described in Embodiment 1.

An embodiment of the present disclosure further provides a non-transitory computer readable program code, which, when executed in a transmitting end controller, will cause the transmitting end controller to carry out the method as described in Embodiment 2.

An embodiment of the present disclosure further provides a non-transitory computer readable medium, including a computer readable program code, which will cause a transmitting end controller to carry out the method as described in Embodiment 2.

The above apparatuses and methods of the present disclosure may be implemented by hardware, or by hardware, such as a computer, in combination with software. The present disclosure relates to such a computer-readable program that when the program is executed by a logic device, the logic device is enabled to carry out the apparatus or components as described above, or to carry out the methods or steps as described above. The present disclosure also relates to a non transitory computer readable storage medium for storing the above program, such as a hard disk, a floppy disk, a CD, a DVD, and a flash memory, etc.

The present disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

What is claimed is:

1. An apparatus for monitoring in-line signal quality, configured in a receiving end of a multicarrier optical communication system based on discrete multi-tone modulation, the apparatus comprising:
    a first setting unit configured to, according to signal to noise ratios (SNRs) of subcarriers obtained in a transmission initialization period, set a subcarrier with a highest SNR to be a pilot subcarrier and other subcarriers to be data subcarriers;
    a determining unit configured to determine bit allocation and power allocation of the pilot subcarrier and bit allocation and power allocation of the data subcarriers;
    a second setting unit configured to set data-decision-based SNR measurement thresholds for the data subcarriers according to the bit allocation of the data subcarriers; and
    a processing unit configured to compare the SNRs of the data subcarriers obtained through data-decision-based SNR measurement in a transmission period with the SNR measurement thresholds of the data subcarriers, and when an SNR of a data subcarrier is less than a corresponding SNR measurement threshold, trigger pilot-based SNR measurement of the data subcarrier.

2. The apparatus according to claim 1, wherein the determining unit comprises:
    a determining module configured to determine the bit allocation and power allocation of the pilot subcarrier according to a system presetting; and
    a calculating module configured to calculate corresponding bit allocation and power allocation for the data subcarriers according to the SNRs of the data subcarriers.

3. The apparatus according to claim 1, wherein the second setting unit comprises:
    a first determining module configured to obtain, through simulation, a relationship between actual SNRs and SNRs obtained through data-decision-based measurement under system model noise for different data modulation bits;
    a setting module configured to take a measurement value in each data modulation bit differing from an actual value by a predetermined amount as a data-decision-based SNR measurement threshold to which the data modulation bit corresponds; and
    a second determining module configured to determine the data-decision-based SNR measurement thresholds of the data subcarriers according to the bit allocation of the data subcarriers.

4. The apparatus according to claim 3, wherein the SNRs obtained through measurement are measurement values obtained by adding noise complying with noise characteristics to the actual SNRs in a data modulation constellation and performing data-decision-based SNR measurement on data with the noise.

5. The apparatus according to claim 1, wherein the processing unit comprises:
- a transmitting module configured to transmit a pilot-based SNR measurement request regarding the data subcarrier to a transmitter in a transmitting end;
- a synchronizing module configured to synchronize with the transmitter; and
- a receiving module configured to receive data in the pilot subcarrier, receive a training sequence in the data subcarrier, and measure the SNR of the data subcarrier based on the training sequence; and
- the transmitting module transmits a notification message to the transmitter after the receiving module finishes measurement and notifies the transmitter to withdraw from the pilot-based SNR measurement regarding the data subcarrier.

6. An apparatus for monitoring in-line signal quality, configured in a transmitting end of a multicarrier optical communication system based on discrete multi-tone modulation, the apparatus comprising:
- a controlling unit configured to control a transmitter to transmit training sequences in subcarriers in a transmission initialization period;
- a configuring unit configured to acquire bit allocation and power allocation of the subcarriers and a position of a pilot subcarrier, configure the subcarriers, and map one of data to be transmitted and a training sequence to corresponding subcarriers; and
- a first processing unit configured to, when the transmitter receives a pilot-based SNR (signal to noise ratio) measurement request regarding a data subcarrier, exchange power allocation and bit allocation of the data subcarrier and the pilot subcarrier, adjust a data mapping relationship of the data subcarrier to the pilot subcarrier, adjust a mapping relationship of the training sequence of the pilot subcarrier to the data subcarrier, and synchronize with a receiver in a receiving end.

7. The apparatus according to claim 6, wherein the apparatus further comprises:
- a second processing unit configured to, when the transmitter receives a notification message of measurement completion regarding the data subcarrier, recover power allocation and bit allocation of the data subcarrier and the pilot subcarrier, recover the data mapping relationship of the data subcarrier to the data subcarrier, recover the mapping relationship of the training sequence of the pilot subcarrier to the pilot subcarrier, and synchronize with the receiver in the receiving end.

8. The apparatus according to claim 7, wherein in synchronizing with the receiver in the receiving end, the first processing unit and the second processing unit agree with the receiver on an exchange moment, and perform exchange at the exchange moment.

9. A multicarrier optical communication system based on discrete multi-tone modulation, comprising a transmitter and a receiver, and further comprising a transmitting end controller and a receiving end controller; wherein,
the receiving end controller is configured to:
- according to SNRs (signal to noise ratios) of subcarriers obtained in a transmission initialization period, set a subcarrier with a highest SNR to be a pilot subcarrier and other subcarriers to be data subcarriers;
- determine bit allocation and power allocation of the pilot subcarrier and bit allocation and power allocation of the data subcarriers;
- set data-decision-based SNR measurement thresholds for the data subcarriers according to the bit allocation of the data subcarriers; and
- compare the SNRs of the data subcarriers obtained through data-decision-based SNR measurement in a transmission period with the SNR measurement thresholds of the data subcarriers, and when an SNR of a data subcarrier is less than a corresponding SNR measurement threshold, trigger pilot-based SNR measurement of the data subcarrier;

and the transmitting end controller is configured to:
control a transmitter to transmit training sequences in subcarriers in the transmission initialization period;
acquire bit allocation and power allocation of the subcarriers and a position of a pilot subcarrier, configure the subcarriers, and map one of data to be transmitted and a training sequence to corresponding subcarriers; and
when the transmitter receives a pilot-based SNR measurement request regarding a data subcarrier, exchange power allocation and bit allocation of the data subcarrier and the pilot subcarrier, adjust a data mapping relationship of the data subcarrier to the pilot subcarrier, adjust a mapping relationship of the training sequence of the pilot subcarrier to the data subcarrier, and synchronize with the receiver in the receiving end.

* * * * *